US011218677B2

(12) United States Patent
Tsubota et al.

(10) Patent No.: US 11,218,677 B2
(45) Date of Patent: Jan. 4, 2022

(54) PROJECTION SYSTEM

(71) Applicant: Panasonic Intellectual Property Management Co., Ltd., Osaka (JP)

(72) Inventors: Chiharu Tsubota, Osaka (JP); Ryuji Fuchikami, Fukuoka (JP); Kazuhiro Minami, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/270,740

(22) Filed: Feb. 8, 2019

(65) Prior Publication Data
US 2019/0253679 A1 Aug. 15, 2019

(30) Foreign Application Priority Data

Feb. 9, 2018 (JP) .............................. JP2018-022207

(51) Int. Cl.
*H04N 5/30* (2006.01)
*H04N 9/31* (2006.01)
(Continued)

(52) U.S. Cl.
CPC ........... *H04N 9/3194* (2013.01); *G01B 11/25* (2013.01); *G01S 7/4802* (2013.01); *G01S 7/499* (2013.01);
(Continued)

(58) Field of Classification Search
CPC .. H04N 9/3185; H04N 9/3194; H04N 9/3147; H04N 5/30; G01B 11/25;
(Continued)

(56) References Cited

U.S. PATENT DOCUMENTS 5,114,224 A 5/1992 Miyamoto et al.
2009/0015548 A1 1/2009 Tazaki et al.
(Continued)

FOREIGN PATENT DOCUMENTS

EP 3 273 685 1/2018
JP 04-018613 1/1992
(Continued)

OTHER PUBLICATIONS

Extended European Search Report dated May 16, 2019 in corresponding European Patent Application No. 19155926.9.

*Primary Examiner* — Jeff A Burke
*Assistant Examiner* — Sihar A Karwan
(74) *Attorney, Agent, or Firm* — Wenderoth, Lind & Ponack, L.L.P.

(57) ABSTRACT

A projection system for projecting an image comprises: a visible light projector that projects the image with visible light; an invisible light projector that projects an invisible light image onto the object with invisible light; an imaging device that captures the invisible light image projected from the invisible light projector; and a controller that obtains information regarding reflected light from the object while obtaining three-dimensional measurements of the object to control the image, based on a capture image. The invisible light image includes a bright region and a dark region having a light amount less than the light amount of the bright region. The invisible light projector emits the invisible light to cause the light amount of the dark region in the invisible light image to be more than or equal to an offset value.

10 Claims, 10 Drawing Sheets

(51) Int. Cl.

| | | |
|---|---|---|
| *G06T 7/521* | (2017.01) | |
| *G06F 3/01* | (2006.01) | |
| *G06F 3/041* | (2006.01) | |
| *G06F 3/042* | (2006.01) | |
| *G01S 7/48* | (2006.01) | |
| *G01S 17/06* | (2006.01) | |
| *G03B 21/26* | (2006.01) | |
| *G01S 17/89* | (2020.01) | |
| *G01B 11/25* | (2006.01) | |
| *G01S 7/499* | (2006.01) | |
| *G03B 17/54* | (2021.01) | |
| *G01S 17/86* | (2020.01) | |

(52) U.S. Cl.
CPC .............. *G01S 17/06* (2013.01); *G01S 17/86* (2020.01); *G01S 17/89* (2013.01); *G03B 17/54* (2013.01); *G03B 21/26* (2013.01); *G06F 3/011* (2013.01); *G06F 3/0425* (2013.01); *G06F 3/04166* (2019.05); *G06T 7/521* (2017.01); *H04N 9/3147* (2013.01); *H04N 9/3185* (2013.01); *G06F 2203/04101* (2013.01); *H04N 5/30* (2013.01)

(58) Field of Classification Search
CPC ........ G01S 7/499; G01S 17/86; G01S 7/4802; G01S 17/06; G01S 17/89; G03B 17/54; G03B 21/26; G06T 7/521; G06F 2203/04101; G06F 3/011; G06F 3/04166; G06F 3/0425
USPC ......................................................... 348/745
See application file for complete search history.

(56) References Cited

U.S. PATENT DOCUMENTS

| | | |
|---|---|---|
| 2013/0215235 A1 | 8/2013 | Russell |
| 2013/0222892 A1* | 8/2013 | Jesme .................. G03B 21/132 359/352 |
| 2015/0015699 A1 | 1/2015 | Vieth et al. |
| 2016/0088275 A1 | 3/2016 | Fuchikami |
| 2018/0188020 A1 | 7/2018 | Fuchikami |

FOREIGN PATENT DOCUMENTS

| | | |
|---|---|---|
| JP | 2006-098789 | 4/2006 |
| JP | 2008-039925 | 2/2008 |
| JP | 2009-008932 | 1/2009 |
| JP | 2010-204572 | 9/2010 |
| JP | 2015-173431 | 10/2015 |
| JP | 2017-015872 | 1/2017 |

* cited by examiner

FIG. 4
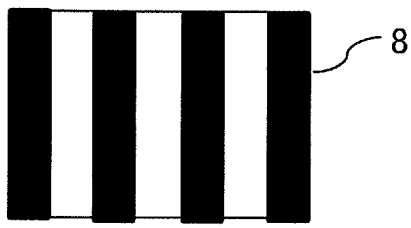
FROM INFRARED LIGHT PROJECTOR 3
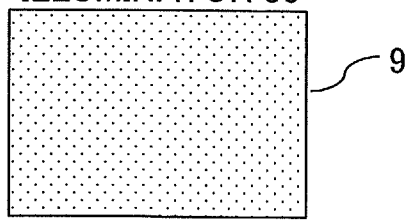
FROM INFRARED LIGHT ILLUMINATOR 30
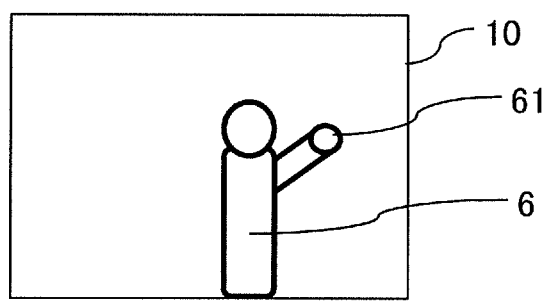
CAPTURE
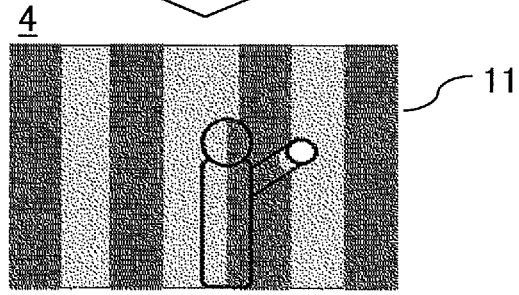
2D DETECTION
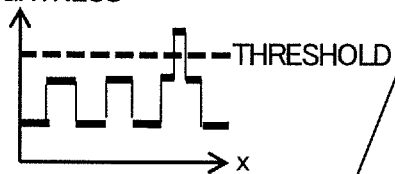
3D MEASUREMENT
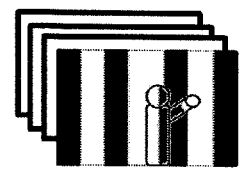
POSITION COORDINATES
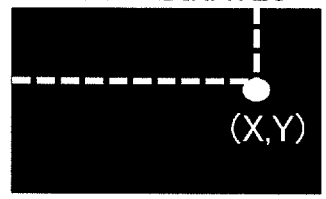
DEPTH IMAGE
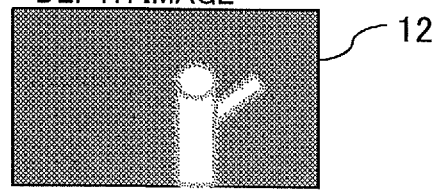

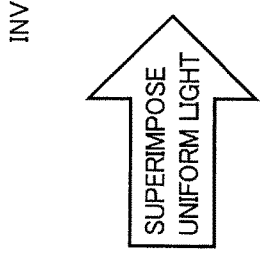
*FIG. 5A*
MEASUREMENT PATTERN
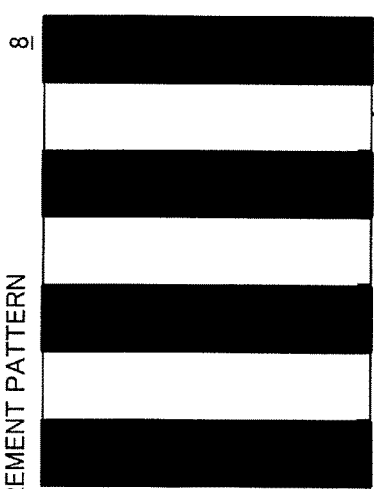
*FIG. 5B*
LIGHT AMOUNT DISTRIBUTION
SUPERIMPOSE UNIFORM LIGHT
*FIG. 5C*
INVISIBLE LIGHT IMAGE
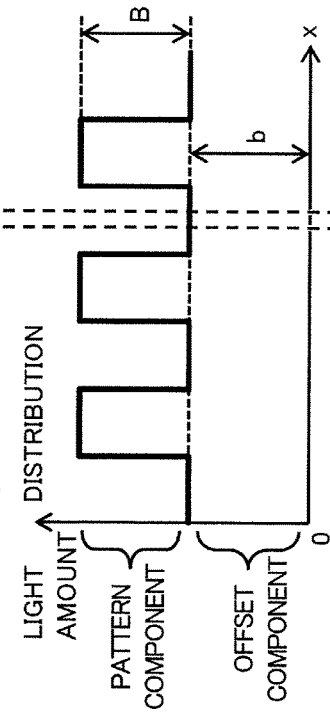
*FIG. 5D*
LIGHT AMOUNT DISTRIBUTION
PATTERN COMPONENT
OFFSET COMPONENT
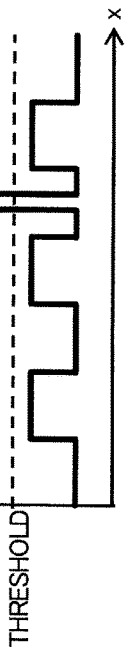
*FIG. 5E*
BRIGHTNESS CAPTURE IMAGE
THRESHOLD

PROJECTION SYSTEM

BACKGROUND

1. Technical Field

The present disclosure relates to a projection system that projects an image fit for a shape, a position, and the like of an object based on three-dimensional measurements of the object and the like.

2. Related Art

JP 2015-173431 A discloses a projection system for projection mapping for projection mapping to project image content onto a structure such as a building. In the projection system, a projection apparatus radiates, onto the structure, image light showing image content and pattern light showing a pattern image in which projection coordinates in a projection coordinate system are coded. Further, a capture apparatus captures an image of the pattern image projected onto the structure. The projection system enables projection mapping while the image content is positioned for the structure.

SUMMARY

The present disclosure provides a projection system that projects an image and that can facilitate obtaining information on the object while obtaining three-dimensional measurements of the object.

The projection system according to the present disclosure projects an image based on a measurement of the object. The projection system includes a visible light projector, an invisible light projector, an imaging device, and a controller. The visible light projector projects an image with visible light. The invisible light projector projects an invisible light image onto the object with invisible light. The imaging device captures the invisible light image projected from the invisible light projector. The controller obtains information regarding reflected light reflected from the object while obtaining three-dimensional measurements of the object to control the image, based on a capture image captured with the imaging device. The invisible light image includes a bright region having a predetermined light amount and a dark region having a light amount less than the light amount of the bright region. The invisible light projector emits the invisible light to cause the light amount of the dark region in the invisible light image to be more than or equal to a predetermined offset value.

The projection system according the present disclosure captures the invisible light image having the light amount more than or equal to the offset value during projection of the image. This configuration enables the projection system to facilitate obtaining the information on the object while obtaining the three-dimensional measurements of the object.

BRIEF DESCRIPTION OF DRAWINGS

FIG. 4 is a drawing illustrating projecting operation of the projection system according to the first embodiment.

FIGS. 5A to 5E are drawings illustrating an invisible light image used for two-dimensional detection according to the first embodiment.

DESCRIPTION OF EMBODIMENTS

Embodiments will be described in detail below with appropriate reference to the drawings. However, description in more detail than is necessary may be omitted. For example, a detailed description of a well-known matter and a redundant description on substantially the same configuration may be omitted. This is to avoid the following description being unnecessarily redundant and to help those skilled in the art to easily understand the following description.

The applicant has provided the accompanying drawings and the following description to help those skilled in the art to fully understand the present disclosure. Accordingly, the accompanying drawings and the following description should not be construed as limiting the spirit and scope of the claims.

First Embodiment

1. Configuration

Figure 1:
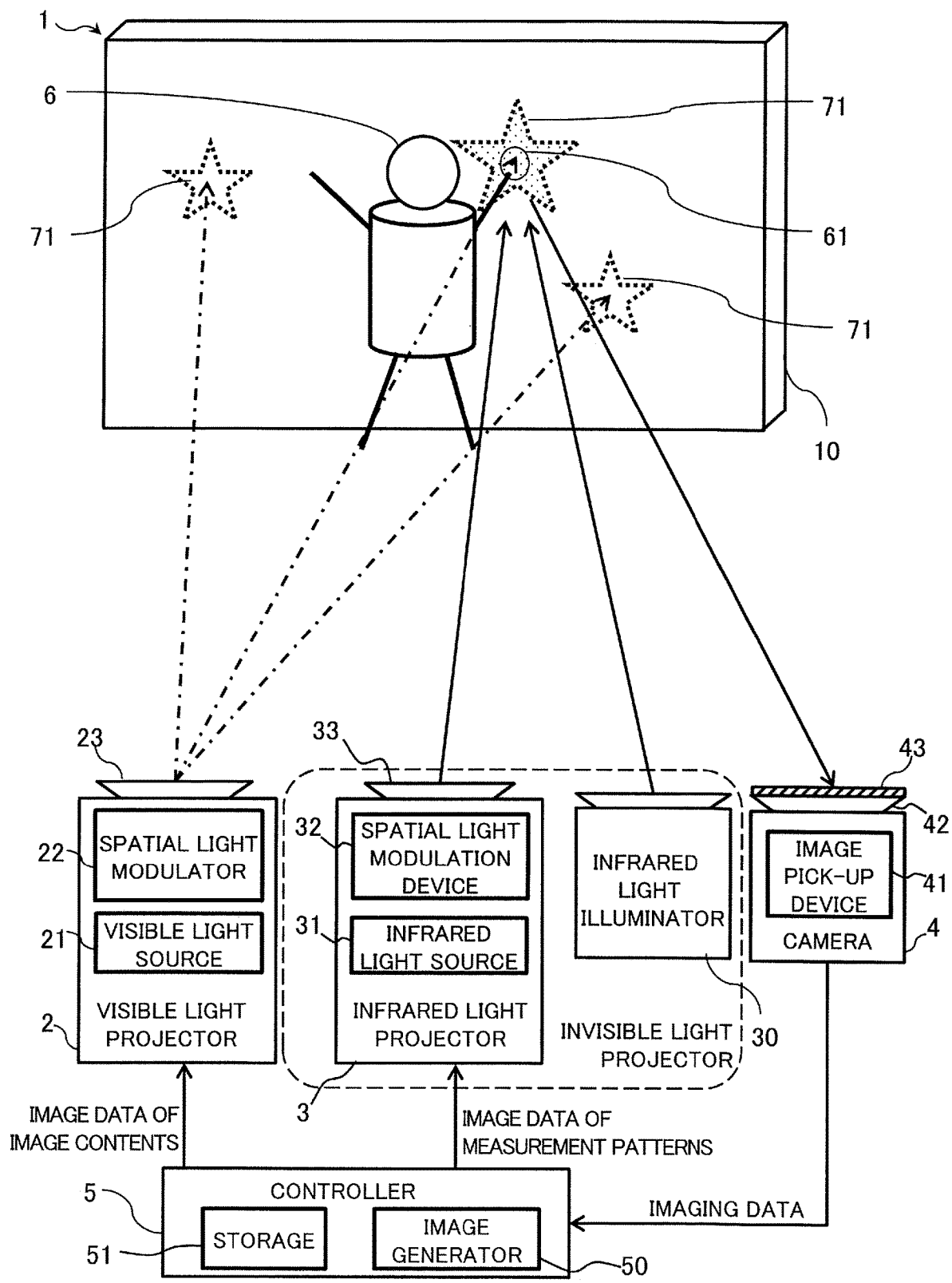
FIG. 1 is a block diagram illustrating a configuration of a projection system according to a first embodiment.

With reference to FIG. 1, a configuration of a projection system according to a first embodiment will now be described. FIG. 1 is a block diagram illustrating a configuration of a projection system 1 according to this embodiment.

As shown in FIG. 1, the projection system 1 according to this embodiment includes a visible light projector 2, an infrared light projector 3, an infrared light illuminator 30, a camera 4, a controller 5, and a screen 10. The projection system 1 is a projection mapping system that projects visible light images onto a subject 6 such as a person or the like for staging for example. The projection system 1 obtains three-dimensional measurements of the subject 6 using the infrared light projector 3 and the camera 4 to allow the visible light projector 2 to project an image 71 with visible light in response to a three-dimensional shape and other measurements of the subject 6.

Furthermore, the projection system 1 of this embodiment performs two-dimensional detection for successively obtaining a two-dimensional position of a marker 61 held by the subject 6 to get the image 71 to follow the motion of the subject 6 with a high degree of precision. In this embodiment, the projection system 1 uses the infrared light illuminator 30 in addition to the infrared light projector 3 and other components for the three-dimensional measurement described above to make the two-dimensional detection of the marker 61 faster.

The marker 61 indicates a reference position at which the image 71 is projected on the subject 6. For example, the marker 61 is attached to a portion of the subject 6 which is supposed to move fast, e.g. a limb of a person. In this embodiment, the marker 61 is made up of a reflecting component having retroreflectivity.

The visible light projector 2 is a projector using the DLP, 3LCD, or LCOS technology, for example. The visible light projector 2 emits visible light based on image signals (image data) entering from the controller 5 so as to project the image 71 that contains various image contents, for example. The visible light projector 2 is an example of visible light projectors according to this embodiment. As shown in FIG. 1, the visible light projector 2 includes a visible light source 21, a spatial light modulator 22, and a projection optical system 23.

In this embodiment, the visible light source 21 includes a plurality of luminous elements (e.g. LEDs) that emit red, green, and blue rays of light, respectively. The visible light source 21 may include a sole monochrome luminous element or a white color luminous element appropriately depending on a projection method adopted for the visible light projector 2. The luminous elements may be laser diodes, halogen or other lamps.

The spatial light modulator 22 is made up of three spatial light modulation devices corresponding to RGB, for example. The spatial light modulation devices can be DMD or LCD chips, or other devices. The spatial light modulator 22 need not necessarily be made up of the three spatial light modulation devices, but may be made up of a sole spatial light modulation device, for example.

The projection optical system 23 includes a zoom lens for defining an angle of view for the visible light projector 2 and a focus lens for focus adjustment.

The infrared light projector 3 is a projector using the DLP, LCD, or LCOS technology, for example. The infrared light projector 3 projects a predetermined infrared measurement pattern described later and the like based on the image signals (image data) entering from the controller 5, for example.

The infrared light projector 3 and the infrared light illuminator 30 according to this embodiment are examples of invisible light projectors that project invisible light images with invisible light. This embodiment employs infrared light as an instance of invisible light. Instead, any invisible light, e.g. ultraviolet light, may be used, other than infrared light. As shown in FIG. 1, the infrared light projector 3 includes an infrared light source 31, a spatial light modulation device 32, and a projection optical system 33.

The infrared light source 31 emits infrared light having a peak wavelength of 800 nm to 900 nm, for example. The infrared light source 31 includes a luminous element such as a laser diode. The luminous element of the infrared light source 31 may be an LED, a lamp, or another element.

The spatial light modulation device 32 is made up of a DMD or LCD chip, or another device. The spatial light modulation device 32 forms an image on an image formation surface thereof based on the image signals entering from the controller 5 or another unit. Infrared light emitted from the infrared light source 31 is incident on the image formation surface of the spatial light modulation device 32 to be spatially modulated.

The projection optical system 33 includes a zoom lens for defining an angle of view for the infrared light projector 3 and a focus lens for focus adjustment.

The infrared light illuminator 30 is an example of illuminators that projects infrared light as invisible light. The infrared light illuminator 30 includes a light source such as an LED or a lamp. The infrared light illuminator 30 emits infrared light having a peak wavelength of 800 nm to 900 nm, for example.

The infrared light illuminator 30 and the infrared light projector 3 are arranged to be able to irradiate an identical area with infrared light, for example. The infrared light illuminator 30 and the camera 4 are arranged in close proximity to each other and oriented in almost the same direction such that their respective optical axes align with each other.

The projectors 2 and 3 are arranged to project images onto an identical area, for example. The projectors 2 and 3 may be optically coupled each other such that their respective optical axes align with each other. In this case, the projectors may each include a dichroic mirror or any other device that transmits visible light while reflecting infrared light or that reflects visible light while transmitting infrared light. In this case, the projection optical systems 23 and 33 may be integrated each other. Alternatively, the infrared light projector 3 and the visible light projector 2 may be integrated each other to act as a single instrument.

The camera 4 is disposed at a position that allows capture of an image of an area onto which invisible light images are projected from the infrared light projector 3 and another component. The camera 4 captures a measurement pattern that is projected onto the subject 6 with infrared light and generates an image of the captured pattern. The camera 4 outputs imaging data, i.e. data indicating the image of the captured pattern, to the controller 5. The camera 4 is an example of any imaging device for use in the projection system 1. As shown in FIG. 1, the camera 4 includes an image pick-up device 41, an imaging lens 42, and a visible light cut-off filter 43.

The image pick-up device 41 includes a solid-state image sensing device, e.g. a CCD or CMOS image sensor made primarily from silicon. The image pick-up device 41 has an imaging surface that contains a plurality of arranged pixel circuits for receiving light. The principal material used for the image pick-up device 41 may be any material, such as germanium or gallium, other than silicon.

The imaging lens 42 includes a zoom lens for defining an angle of view for the camera 4 and a focus lens for focus adjustment.

The visible light cut-off filter 43 is a bandpass filter or a longpass filter that transmits infrared light components and absorbs visible light components of incident light. The visible light cut-off filter 43 is attached to the imaging lens 42, for example. The visible light cut-off filter 43 is an example of any wavelength selector used for the camera 4 to selectively transmit infrared light.

The visible light cut-off filter 43 may be integrated with the imaging lens 42 through means such as forming a coating or a diffraction grating on the imaging lens 42. Alternatively, the visible light cut-off filter 43 may be built into an image formation surface (that is, imaging surface) or any other part of the image pick-up device 41. The visible light cut-off filter 43 may be configured to reflect visible light components in place of or in addition to absorbing visible light components.

The controller 5 is a controller that controls components of the projection system 1. The controller 5 includes a central processing unit (CPU) or a micro processing unit (MPU) to implement predetermined functions in collaboration with software, for example. As shown in FIG. 1, the controller 5 includes an image generator 50 and a storage 51. The controller 5 is an example of any controller for use in the projection system 1 according to this embodiment.

The controller 5 reads data and programs stored in the storage 51 and performs various arithmetic operations to implement functions of every kind. For example, the controller 5 implements functions required for the image generator 50. The controller 5 may control timings for acts performed by the components such as the camera 4, the infrared light projector 3, and the visible light projector 2 (e.g. control for synchronization between the units), as well as perform zoom control, focus control, and other control.

The controller 5 may be a hardware circuit such as an electronic circuit specifically designed for implementing predetermined functions or a reconfigurable electronic circuit. The controller 5 may include any of semiconductor integrated circuits, such as a CPU, an MPU, a graphics processing unit (GPU), a microcontroller, a digital signal processor (DSP), a field-programmable gate array (FPGA), and an application specific integrated circuit (ASIC). The functions of the controller 5 may be built into respective units of the projection system 1 such as the visible light projector 2.

The image generator 50 generates image data that specifies the image 71 to be projected from the visible light projector 2. The image data needs to be generated such that projection of the image 71 is allowed to follow the motion of the subject 6. To achieve this, in this embodiment, the controller 5 obtains three-dimensional measurements of a shape of the subject 6 based on the imaging data sent from the camera 4 while detecting a two-dimensional position of the subject 6 at high speed.

The storage 51 is a storage medium for storing programs and data needed to implement functions of the controller 5. The storage 51 includes a hard disk drive (HDD) or a solid state drive (SSD), for example. The storage 51 may further include a dynamic random-access memory (DRAM), a static random-access memory (SRAM), or any other semiconductor device so as to store data temporarily and act as a workspace for the controller 5. The storage 51 stores image data for image content of various kinds and image data for measurement patterns described later, for example.

The screen 10 is disposed behind the subject 6 in projecting directions of the projectors 2 and 3. The screen 10 is an example of any background member for showing the image 71 that constitutes a background for the subject 6 in the projection system 1. The screen 10 enables projection of the image 71 in conjunction with the motion of the subject 6 and enhances stage effect produced by projection mapping, for example. The projection system 1 of this embodiment may omit the screen 10 as necessary when a background effect is not particularly required.

2. Operation

Operation of the projection system 1 having the configuration described above will now be described.

2-1. Theory of Three-Dimensional Measurement

Figure 2:
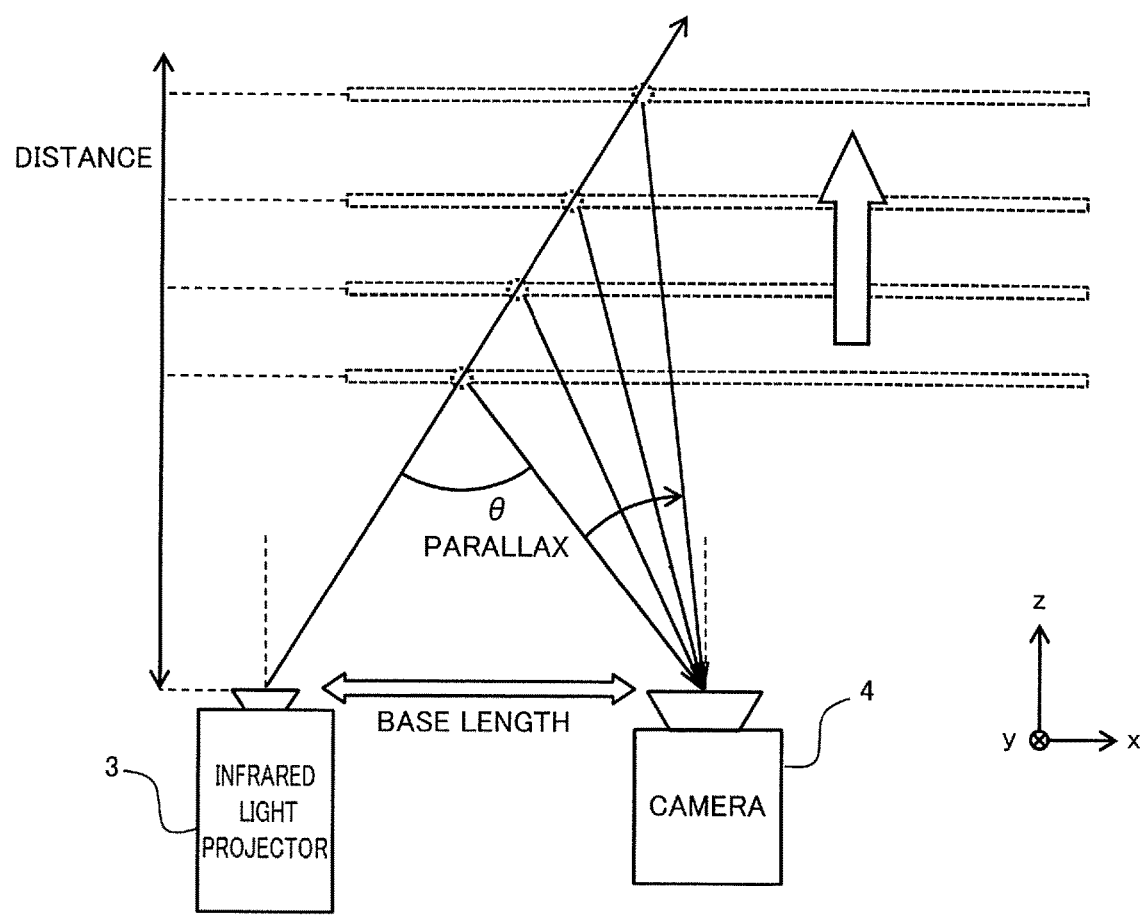
FIG. 2 is a drawing illustrating a theory of three-dimensional measurement used in the projection system.
Figure 3A:
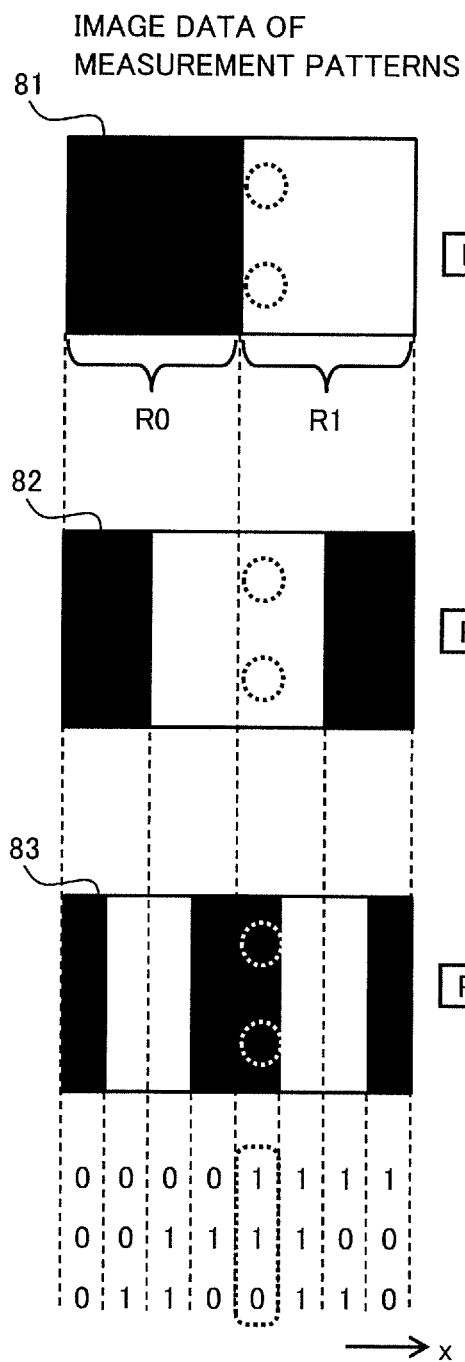
FIGS. 3A and 3B are drawings illustrating measurement patterns in accordance with a spatial coding scheme.

This embodiment adopts spatial coding scheme-based active stereo measurement as an example of a theory of obtaining three-dimensional measurements of the subject 6. The theory of this measurement will now be described with reference to FIGS. 2, 3A, and 3B. FIG. 2 is a drawing illustrating a theory of three-dimensional measurement. FIGS. 3A*a* and 3B are drawings illustrating measurement patterns in accordance with a spatial coding scheme.

In FIG. 2, the camera 4 and the infrared light projector 3 are arranged side by side such that their respective optical axes are parallel to each other. In the following description, the direction of these optical axes is defined as a z direction as shown in FIG. 2. A direction that is orthogonal to the z direction and along which the camera 4 and the infrared light projector 3 are aligned each other is defined as an x direction. A direction orthogonal to the z and x directions is a y direction.

FIG. 2 shows infrared light emitted from the infrared light projector 3 being reflected at a certain point (a luminous point) of an object and light reflected from the luminous point being incident on the camera 4. As shown in FIG. 2, a parallax θ is formed by lines extending from the camera 4 and the infrared light projector 3. Capturing an image projected from the infrared light projector 3 with the camera 4 causes the projected image to appear on the image captured with the camera 4 at a displacement of the parallax θ. In other words, an x coordinate of the luminous point of the object on the image captured with the camera 4 varies with distance to the luminous point, as shown in FIG. 2.

In the projection system 1, the controller 5 determines distance in the z direction based on the coordinate variation described above by using a trigonometric approach in which the interval between the camera 4 and the infrared light projector 3 is taken as a base length. The base length is obtained in advance through calibration at the time of installation of the projection system 1 or other events, for example. The coordinate variation is determined using measurement patterns in accordance with the spatial coding scheme. A method of this determination will now be described with reference to FIGS. 3A and 3B.

FIG. 3A illustrates image data indicating a set of measurement patterns 81, 82, and 83 projected from the infrared light projector 3. The measurement patterns 81 to 83 each include at least one bright region R1 and at least one dark region R0 that are arranged along a direction of the x coordinate subject to determination of variation. The bright region R1 is greater in light amount than the dark region R0. According to the spatial coding scheme, "1" and "0" are assigned to the bright region R1 and the dark region R0, respectively, such that the x coordinate on image data is coded.

In the illustration of FIG. 3A, the measurement pattern 81 corresponding to a first step, the measurement pattern 82 corresponding to a second step, and the measurement pattern 83 corresponding to a third step are sequentially projected. The three measurement patterns 81 to 83 projected in order of the first to third steps as time elapses generate 3-bit codes that correspond to eight regions on the image data.

Figure 3B:
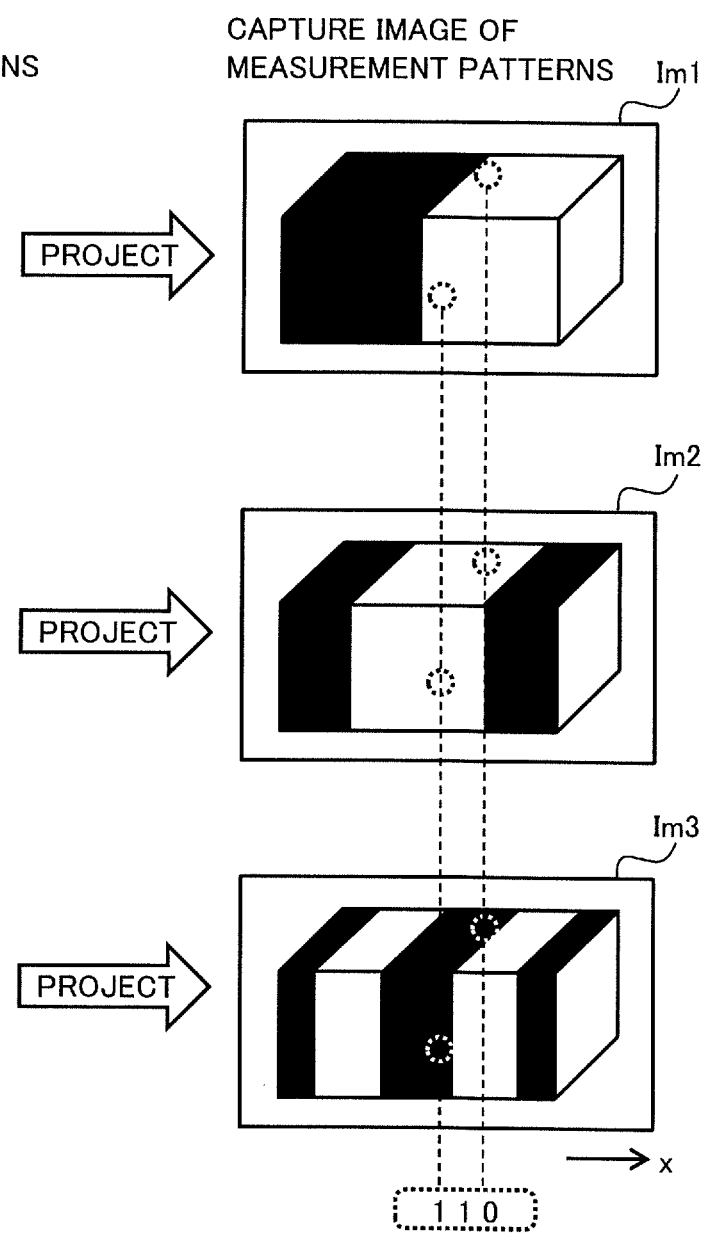

FIG. 3B illustrates capture images Im1, Im2, and Im3 that are each generated when the camera 4 captures the object on which a corresponding one of the measurement patterns 81, 82, and 83 of FIG. 3A is projected. As shown in FIG. 3B, the x coordinate of luminous points of the object on the capture images varies with the depth dimension on the object even if the luminous points are associated with an identical code "110". In this embodiment, the controller 5 determines the coordinate variation by decoding imaging data indicating the capture images Im1, Im2, and Im3 at the image generator 50.

Specifically, the controller 5 assesses every pixel in one frame of a capture image by comparing the brightness of the pixel with a predetermined threshold. The predetermined threshold is a reference threshold value for determining pixels in the capture image that reflect luminous points in bright regions of measurement patterns. The predetermined threshold is set in consideration of the amount of noise light, for example. The controller 5 assesses each pixel against the threshold by assigning "1" to the pixel whose brightness is determined to exceed the threshold and "0" to the pixel whose brightness is determined not to exceed the threshold.

The controller 5 performs the processing described above on all the capture images Im1, Im2, and Im3. The controller 5 decodes the imaging data by compiling binary values ("0" or "1") assigned to the pixels each.

The controller 5 determines x coordinate variation by comparing the x coordinate value shown from the decoded data with the reference x coordinate value for every pixel. The controller 5 can determine y coordinate variation as well in like manner with the description above, for example, by using measurement patterns that are obtained through a 90-degree rotation of the measurement patterns 81 to 83 of FIG. 3A. If a parallax is formed by lines extending from the infrared light projector 3 and the visible light projector 2 as well, the controller 5 obtains information about installation locations of the two projectors in advance and converts three-dimensional coordinates defined for the infrared light projector 3 into three-dimensional coordinates defined for the visible light projector 2 as appropriate, for example.

2-2. Two-Dimensional Detection

The outline of two-dimensional detection in the projection system 1 according to this embodiment will now be described.

In this embodiment, two-dimensional detection is performed so as to obtain a position and the like of the marker 61 at high speed using the capture images of the measurement patterns 81 to 83 (FIG. 3A) for three-dimensional measurement as described above. The images captured with the camera 4 include some portion capturing the bright regions R1 in the measurement patterns 81 to 83 projected from the infrared light projector 3 (hereinafter, referred to as "bright portions") and other portion capturing the dark regions R0 (hereinafter, referred to as "dark portions").

In the projection system 1, the marker 61 held by the subject 6 may be positioned in the dark region R0 during the projection of a certain measurement pattern. If it fails to obtain light reflected from the marker 61, the marker 61 would not be imaged in the camera 4. This prevents the marker 61 from being detected in the dark portions of each frame of the capture image, which makes it difficult to perform the two-dimensional detection on each frame of the capture image.

To address this problem, the projection system 1 of this embodiment causes the infrared light illuminator 30 to irradiate the subject 6 holding the marker 61 with infrared light as uniform light when the infrared light projector 3 to project the measurement patterns 81 to 83 onto the subject 6. As a result, light reflected from the marker 61 can be obtained regardless of the measurement patterns 81 to 83 projected from the infrared light projector 3, and the marker 61 can be detected in each frame of the image captured with the camera 4.

An alternative method for the two-dimensional detection might be performed by decoding images that result from capturing a plurality of measurement patterns, comparing coordinates obtained from the decoding results with reference coordinates to obtain three-dimensional measurement, and detecting some of contours of a generated shape as the position of the subject, for example. However, this method requires a plurality of frames of the capture image in order to detect a specific location on the subject.

In contrast to this, the two-dimensional detection of this embodiment allows the marker 61 to be detected in each frame of the capture image. Accordingly, the time required to obtain the position of the marker 61 can be remarkably reduced. This allows the projection system 1 to reduce the time required to project the image 71 in accordance with the position of the marker 61 on the subject 6 and perform projecting operation with reduced variation in position of the subject 6.

2-3. Projecting Operation (Projection Mapping)

With reference to FIGS. 1 and 4, the projecting operation of the projection system 1 for performing projection mapping according to this embodiment will be described. FIG. 4 is a drawing illustrating the projecting operation according to this embodiment.

In this embodiment, the infrared light projector 3 sequentially projects each pattern in a set of the measurement patterns 81 to 83 (see FIG. 3A) onto a range including an entire projection surface of the screen 10, the subject 6, and other regions. FIG. 4 illustrates one frame of a measurement pattern 8 projected from the infrared light projector 3. A frame rate at which the infrared light projector 3 projects images is, for example, 60 fps to 240 fps.

The infrared light illuminator 30 uniformly irradiates a range where the measurement pattern 8 is projected with infrared light having uniform distribution 9. In this embodiment, the measurement pattern 8 from the infrared light projector 3 and the uniform distribution 9 of the infrared light from the infrared light illuminator 30 are superimposed on each other within the same range to form an invisible light image (See FIG. 5C).

At this time, the camera 4 captures the invisible light image formed of the measurement pattern 8 and the uniform distribution 9 of the infrared light to generate a capture image 11. The camera 4 outputs imaging data showing the capture image 11 to the controller 5. The camera 4 captures an image of each frame of the measurement pattern 8 in synchronization with the operation of the infrared light projector 3 under control of the controller 5, for example.

The controller 5 performs the three-dimensional measurement and the two-dimensional detection based on the capture image 11 shown by the imaging data. In this embodiment, three-dimensional shapes including contours and asperities of the subject 6 and the like are subject to the three-dimensional measurement, for example. Two-dimensional coordinates indicating the position of the marker 61 on the subject 6 in the capture image 11 are subject to the two-dimensional detection. The image generator 50 of the controller 5 (FIG. 1) generates image data including image content to be projected onto the subject 6 in accordance with the results of the three-dimensional measurement and the two-dimensional detection.

The three-dimensional measurement is performed based on a plurality of frames of capture image 11. Specifically, in a capture image corresponding to each pattern in a set of the measurement patterns 81 to 83 (FIG. 3B) of the spatial coding scheme described above, the controller 5 measures a distance from each pixel to the controller 5 and generates a depth image 12 representing the distance measured for each pixel as a depth.

On the other hand, the two-dimensional detection is performed on each frame of the capture image 11, for example. In this embodiment, the controller 5 detects a position of a pixel having brightness more than the predetermined threshold in each frame of the capture image 11 as a position of the marker 61 on the subject 6, and obtains two-dimensional position coordinates (X, Y) in the capture image 11. Details of the two-dimensional detection will be described later.

Based on the generated depth image 12 and the obtained two-dimensional coordinates, the image generator 50 of the controller 5 corrects the image data such that the image 71 projected onto the subject 6 is appropriately shown. The image data is prestored in the storage 51, for example. For example, the image generator 50 three-dimensionally corrects the image 71 each time the depth image 12 is generated. Within a period corresponding to a plurality of frames until a new depth image is obtained, the image generator 50 two-dimensionally corrects the image 71 on a frame-by-frame basis based on the two-dimensional coordinates sequentially obtained.

The visible light projector 2 sequentially receives the image data from the image generator 50 of the controller 5 and projects the image 71 specified by the received image data onto the subject 6 and the screen 10 at a predetermined frame rate. The frame rate at which the visible light projector 2 projects images is the same as the frame rate at which the camera 4 captures images, for example.

According to the above projecting operation, the two-dimensional detection of the marker 61 is performed speedily while the three-dimensional measurements of the subject 6 are obtained based on the capture image 11 of the invisible light image. This allows the image 71 projected from the visible light projector 2 to follow the motion of the subject 6 precisely.

As shown in FIG. 1, the camera 4 of this embodiment is provided with the visible light cut-off filter 43 that cuts off visible light components and transmits infrared light components out of light incident on the camera 4. This configuration allows the camera 4 to capture measurement patterns projected from the infrared light projector 3 precisely without interfering with projection of the image with visible light performed by the visible light projector 2.

In the above projecting operation, the image generator 50 may also generate image data including the image 71 to be projected onto the screen 10 and outputs the image data to the visible light projector 2. The storage 51 prestores information on a location and a form (orientation) of the screen 10 through calibration at the time of installation of the projection system 1 or other events, for example. With reference to the information described above, the image generator 50 corrects the image 71 to be projected onto the screen 10 at the time of projecting operation.

2-4. Details of Two-Dimensional Detection

Details of the two-dimensional detection using the invisible light image of this embodiment will be described with reference to FIGS. 5A to 5E. FIGS. 5A to 5E are drawings illustrating an invisible light image 80 used for the two-dimensional detection of this embodiment. For the sake of simplicity, a description will be given below of an example in which the invisible light image 80 and other images are projected onto an object having no three-dimensional distortion.

FIG. 5A illustrates an example of the measurement patterns 8 projected from the infrared light projector 3 in the projection system 1 of this embodiment. FIG. 5B illustrates a distribution of the amount of light in the measurement pattern 8 in FIG. 5A. FIG. 5B illustrates amounts of light distributed in the x direction (this also applies to FIGS. 5D and 5E).

In this embodiment, as shown in FIGS. 5A and 5B, a value indicating the amount of light distributed in the dark region R0 of the measurement pattern 8 projected from the infrared light projector 3, that is, a light amount value, is "0". A light amount value of the bright region R1 is more than the light amount value of the dark region R0 by a predetermined difference B (hereinafter, referred to as "contrast difference B"). The contrast difference B in the measurement pattern 8 is appropriately set from the viewpoint of threshold determination in the three-dimensional measurement.

FIG. 5C illustrates an example of the invisible light images 80 according to this embodiment. FIG. 5D illustrates a distribution of light amounts in the invisible light image 80 of FIG. 5C. FIG. 5E illustrates an example of the capture image 11 corresponding to the invisible light image 80 of FIG. 5C.

FIG. 5C illustrates the invisible light image 80 based on the measurement pattern 8 of FIG. 5A. The projection system 1 of this embodiment superimposes the uniform light emitted from the infrared light illuminator 30 on the measurement pattern 8 projected from the infrared light projector 3 and projects the invisible light image 80. As shown in FIG. 5D, the invisible light image 80 includes a pattern component and an offset component.

The pattern component of the invisible light image 80 has the contrast difference B between the bright region R1 and the dark region R0 in accordance with the measurement pattern 8 projected from the infrared light projector 3. The offset component of the invisible light image 80 has an offset value b corresponding to an amount of the uniform light emitted from the infrared light illuminator 30. The offset value b is a predetermined positive value that is other than "0", and is set as appropriate from the viewpoint of threshold determination in the two-dimensional detection and the like.

In the invisible light image 80 as described above, as shown in FIG. 5D, the light amount value of the dark region R0 is more than "0" by the offset value b. This makes it possible to receive, in the two-dimensional detection of this embodiment, reflected light having a light amount based on the offset value b from the marker 61 even if the marker 61 is positioned in the dark region R0 of the invisible light image 80 (see FIG. 5C). FIG. 5E illustrates a brightness distribution of the capture image 11 in such a case.

In the projection system 1 of this embodiment, the marker 61 retroreflects the uniform light emitted from the infrared light illuminator 30 toward the camera 4, which makes the position of the marker 61 appear brighter than regions around the marker 61 in the capture image 11. In the example of FIG. 5E, the capture image 11 has a brightness peak P1 corresponding to the marker 61 within a range corresponding to the dark region R0 of the invisible light image 80.

The controller 5 of the projection system 1 obtains the position of the marker 61 such as the peak P1 by comparing brightness in the capture image 11 with a preset threshold in the two-dimensional detection. The threshold used for the two-dimensional detection can be set in consideration of, for example, the bright portion of the capture image 11 and brightness estimated for the marker 61 (peak P1).

The offset value b of the invisible light image 80 for use in the projection system 1 may be set based on, for example, the contrast difference B between the bright region R1 and the dark region R0. The offset value b may be equal to 0.1 times the contrast difference B or another value, for example. For example, such setting of the offset value b allows the brightness at the peak P1 corresponding to the marker 61 in the brightness distribution of the capture image 11 (FIG. 5E) to be remarkably greater than the brightness corresponding to the bright region R1. Further, the offset value b may be set in consideration of, for example, brightness of noise in the brightness distribution of the capture image 11 and the like.

3. Effects and Others

As described above, the projection system 1 according to this embodiment projects the image 71 fit for an object like the subject 6 based on the three-dimensional measurements of the object. The projection system 1 includes the visible light projector 2, the invisible light projector including the infrared light projector 3 and the infrared light illuminator 30, the camera 4, and the controller 5. The visible light projector 2 projects the image 71 onto an object with visible light. The invisible light projector projects the invisible light image 80 onto the object with invisible light. The camera 4 captures the invisible light image 80 projected from the invisible light projector. The controller 5 obtains, based on the capture image 11 captured with the camera 4, information regarding reflected light from the object while obtaining three-dimensional measurements of the object to control the image 71. The invisible light image 80 includes the bright region R1 having the predetermined light amount and the dark region R0 having the light amount less than the light amount of the bright region R1. The invisible light projector emits invisible light to cause the light amount of the dark region R0 in the invisible light image 80 to become equal to or more than the predetermined offset value b.

When the projection system 1 described above projects the image 71 to be fit for the object, the light amount of the dark region R0 in the invisible light image 80 to be captured becomes more than or equal to the offset value b, which enables the two-dimensional detection to be performed on the marker 61 and the like at high speed, i.e. for each frame of the capture image 11. This enables the projection system 1 to easily obtain information on an object such as the position of the marker 61 while obtaining three-dimensional measurements of the object.

Further, in the projection system 1 of this embodiment, an object to be the subject 6 of the projection system 1 includes the marker 61 that reflects infrared light, an example of invisible light. The information regarding the reflected light subject to the two-dimensional detection includes a two-dimensional position of the marker 61. The marker 61 of this embodiment retroreflects, for example, infrared light. The invisible light projector of this embodiment includes the infrared light illuminator 30 as an example of illuminators. The infrared light illuminator 30 projects infrared light in accordance with the offset value b.

The projection system 1 described above causes the infrared light projector 3 to project the measurement pattern 8 onto the subject 6 holding the marker 61 while causing the infrared light illuminator 30 to irradiate the subject 6 holding the marker 61 with the infrared light having the uniform distribution 9. Accordingly, regardless of the bright region R1 and the dark region R0 in the measurement pattern 8, the position of the marker 61 in the capture image 11 is captured as a region having high brightness. Setting a predetermined threshold for extraction of the region having high brightness corresponding to the position of the marker 61 enables the position of the marker 61 in the capture image 11 to be recognized.

As described above, the projection system 1 of this embodiment is capable of detecting the position of the subject 6 at high speed while measuring the shape of the subject 6. The image generator 50 of the controller 5 generates image data specifying an image projected onto an object in accordance with a result of measuring the shape and position of the subject 6. The visible light projector 2 projects the image specified by the image data onto the object with visible light.

In this embodiment, the camera 4 includes the silicon-containing image pick-up device 41 and the visible light cut-off filter 43 that transmits infrared light and absorbs or reflects visible light. This configuration can prevent the camera 4 from receiving visible light even if the image pick-up device 41 has sensitivity to light in the visible spectrum. The camera 4 may omit the visible light cut-off filter 43 in the case of having an image pick-up device without sensitivity to light in the visible spectrum.

In the camera 4 according to this embodiment, the visible light cut-off filter 43 is attached to the imaging lens 42. The visible light cut-off filter 43 may be a filter that is built into the image pick-up device 41 or that is integrated with the imaging lens 42 in the camera 4.

The projection system 1 of this embodiment may include the screen 10 as an example of background members. The screen 10 is disposed behind the subject 6 in a direction of the invisible light emitted from the invisible light projector. The screen 10 of this embodiment can exhibit stage effect and other effect by projecting the image 71 with visible light.

In this embodiment, the invisible light image 80 includes the measurement pattern 8 in accordance with the spatial coding scheme. The invisible light image 80 of this embodiment enables the controller 5 to obtain three-dimensional measurements of an object by decoding the bright region R1 and the dark region R0.

Second Embodiment

A second embodiment will now be described with reference to the attached drawings. In the first embodiment, the position of the marker 61 is obtained through the two-dimensional detection of the projection system 1. In the second embodiment, a projection system that performs two-dimensional detection to obtain, for example, contours of the subject 6 will be described with reference to FIGS. 6 to 8.

The projection system according to this embodiment will now be described. As for some configuration and operation identical to those of the projection system 1 according to the first embodiment, redundant descriptions thereof are omitted.

1. Configuration

Figure 6:
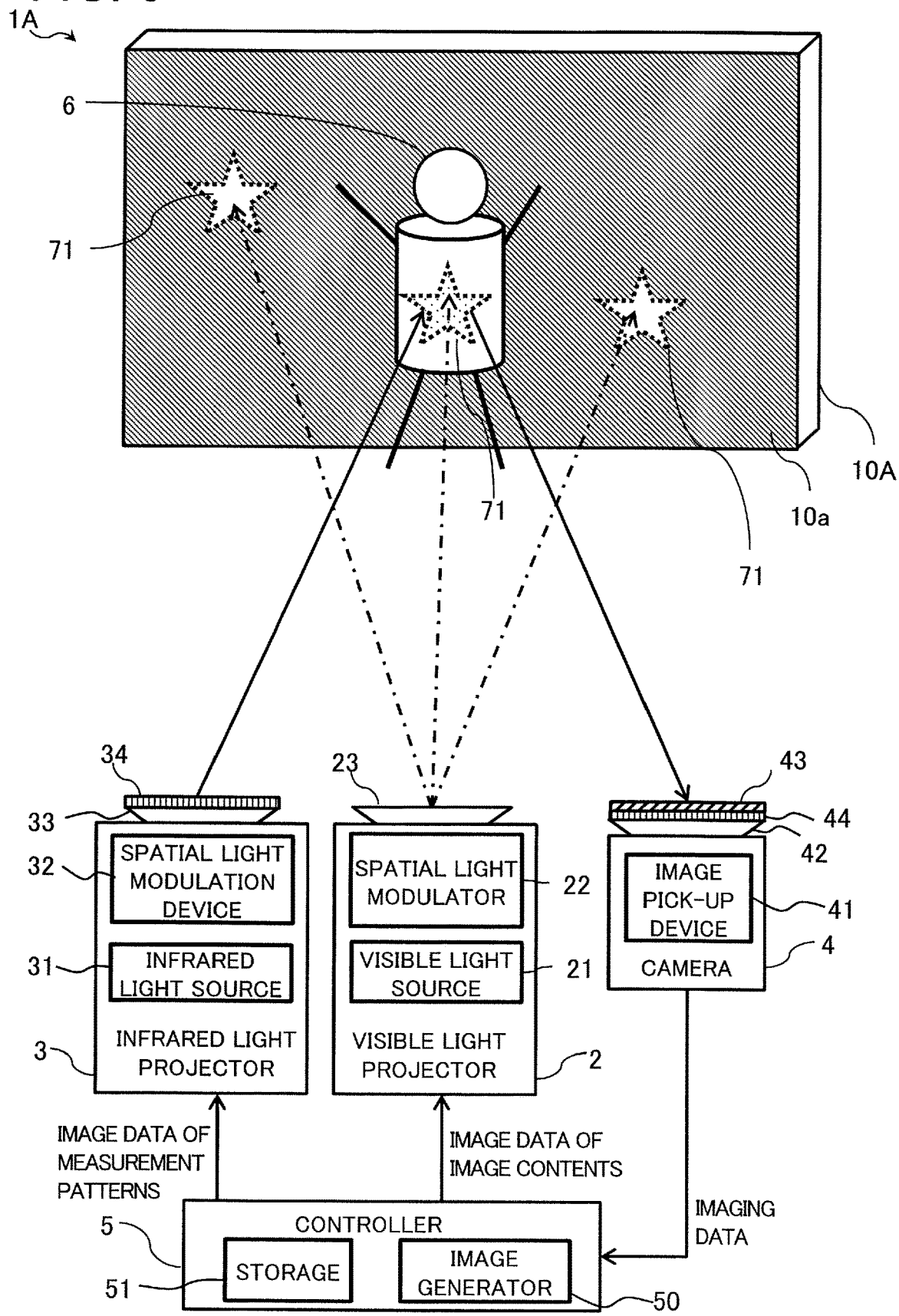
FIG. 6 is a block diagram illustrating a configuration of a projection system according to a second embodiment.

With reference to FIG. 6, a configuration of a projection system 1A according to the second embodiment will now be described. FIG. 6 is a block diagram illustrating the configuration of the projection system 1A according to the second embodiment.

With the same configuration as the configuration of the first embodiment (see FIG. 1), the projection system 1A according to the second embodiment includes a screen 10A constitutes a background member that allows the contours of the subject 6 to be obtained. The projection system 1A of this embodiment further includes first and second polarizing filters 34 and 44 as shown in FIG. 6.

The projection system 1 of the first embodiment projects an invisible light image using the infrared light illuminator 30 and the infrared light projector 3. In this embodiment, a description will be given of an example in which the infrared light illuminator 30 is not used in the projection system 1A. That is, in the projection system 1A of this embodiment, the infrared light projector 3 projects an invisible light image to achieve fast two-dimensional detection. The infrared light projector 3 of this embodiment is an example of invisible light projectors.

The screen 10A of the second embodiment includes a reflecting surface 10a capable of preserving a polarization state. A projection surface of the screen 10A may be a flat surface or a curved surface as long as the projection surface is capable of preserving a polarization state. As the screen 10A of this embodiment, a silver screen having the reflecting surface 10a coated with metal powder may be used.

The first polarizing filter 34 is a polarizing filter that transmits only a linearly polarized component that oscillates in a specific direction out of the invisible light projected from the infrared light projector 3. The first polarizing filter 34 is attached to the projection optical system 33 of the infrared light projector 3, for example. The first polarizing filter 34 is an example of polarizers used for the infrared light projector 3 to polarize invisible light in a specific direction. The first polarizing filter 34 may be disposed between the infrared light source 31 in the projection optical system 33 and the screen 10 or may be integrated with the projection optical system 33.

The second polarizing filter 44 is a polarizing filter that transmits only a linearly polarized component that oscillates in a specific direction out of light incident on the camera 4. The second polarizing filter 44 is installed such that polarization imparted by the second polarizing filter 44 is orthogonal to the polarization imparted by the first polarizing filter 34, which causes the second polarizing filter 44 to cut off infrared light that has been polarized by the first polarizing filter 34 in the specific direction. The second polarizing filter 44 is an example of polarizers that cut off a predetermined polarized component out of incident light.

The second polarizing filter 44 is attached to the imaging lens 42, for example. The second polarizing filter 44 may be disposed between the image pick-up device 41 in the imaging lens 42 and the screen 10A or may be integrated with the imaging lens 42. The second polarizing filter 44 may be built into an image formation surface or any other part of the image pick-up device 41. The second polarizing filter 44 may be integrated with the visible light cut-off filter 43.

2. Operation

Operation of the projection system 1A having the configuration described above will now be described.

2-1. Projecting Operation

Figure 7:
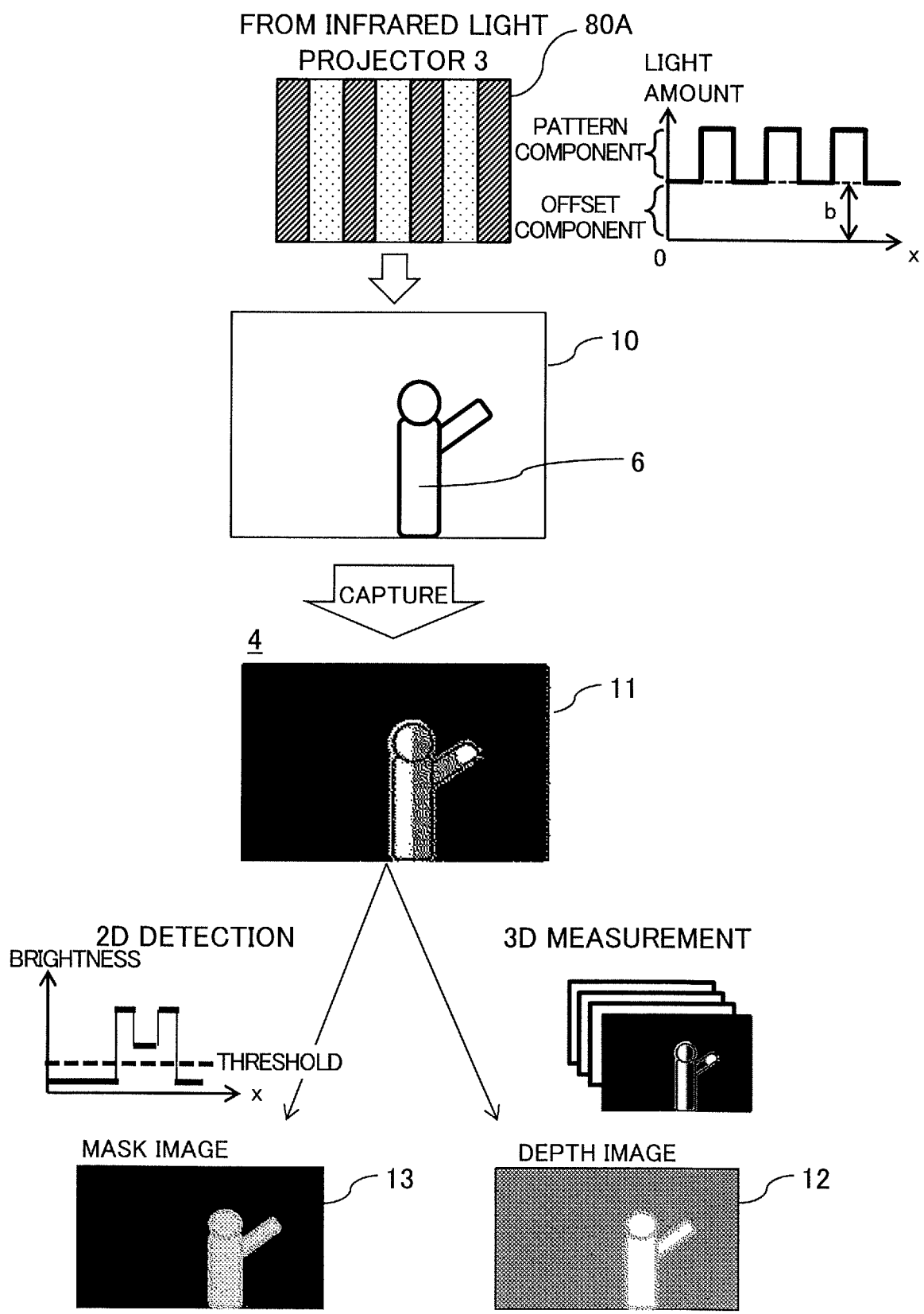
FIG. 7 is a drawing illustrating projecting operation of the projection system according to the second embodiment.

With reference to FIG. 7, projecting operation of the projection system 1A according to the second embodiment will be described. FIG. 7 is a drawing illustrating the projecting operation of the projection system 1A according to this embodiment.

In the projection system 1A of this embodiment, as shown in FIG. 7, the infrared light projector 3 projects an invisible light image 80A including a pattern component corresponding to a measurement pattern used for three-dimensional measurement and an offset component with which a projection range is uniformly irradiated that are superimposed on each other. The offset value b indicating the offset component of the invisible light image 80A is set in image data to be input to the infrared light projector 3 from the controller 5 (FIG. 6), for example.

The invisible light image 80A is projected from the infrared light projector 3 onto the subject 6 and the screen 10A through the first polarizing filter 34. The camera 4 captures, through the second polarizing filter 44, the projected invisible light image 80A. The screen 10A and the first and second polarizing filters 34 and 44 of this embodiment can prevent, as shown in FIG. 7, a portion of the invisible light image 80A positioned on the screen 10A from appearing in the capture image 11 captured with the camera 4. The functions of the screen 10A and the filters 34 and 44 of this embodiment will be described later.

In this embodiment, the controller 5 performs two-dimensional detection to obtain the contours of the subject 6 while obtaining three-dimensional measurements of the subject 6 based on the capture image 11 captured with the camera 4. For example, the controller 5 recognizes, as the subject 6, pixels having high brightness greater than or equal to the predetermined threshold in the capture image 11. The controller 5 generates a mask image 13 that is a binary image in which a pixel region corresponding to the subject 6 is extracted as an object portion. Alternatively, the controller 5 may calculate, as two-dimensional coordinates of the subject 6, positions of pixels corresponding to an edge in any direction of the pixel region corresponding to the subject 6.

According to the above projecting operation, the offset component included in the invisible light image 80A allows the entire image of the subject 6 to appear in all the capture images 11 captured with the camera 4, regardless of the measurement pattern used for three-dimensional measurement. In the capture image 11, the subject 6 appears as a region having remarkably high brightness as compared with the screen 10A, which allows a region having the predetermined threshold or greater to be recognized as the subject 6.

In the case where a substitute image for the invisible light image 80A of this embodiment includes only the measurement pattern without superimposing of the offset component, it is conceivable that a dark portion in the capture image that corresponds to a captured dark region R0 of the subject 6 cannot be distinguished from the screen 10A. This requires extra processing such as combining a capture image of a certain measurement pattern projected from the infrared light projector 3 and another capture image of a pattern resulting from inverting the certain measurement pattern projected in the next frame, for example.

In contrast to the above, this embodiment can remarkably shorten the time required to obtain the contours or position of the subject 6, since the region of the subject 6 and the other region can be distinguished from each other in all the capture images 11. This allows the two-dimensional detection to be performed faster, thereby allowing the image 71 projected in the projection system 1A to follow the motion of the subject 6 with a high degree of precision.

2-2. Screen and Filters

Figure 8:
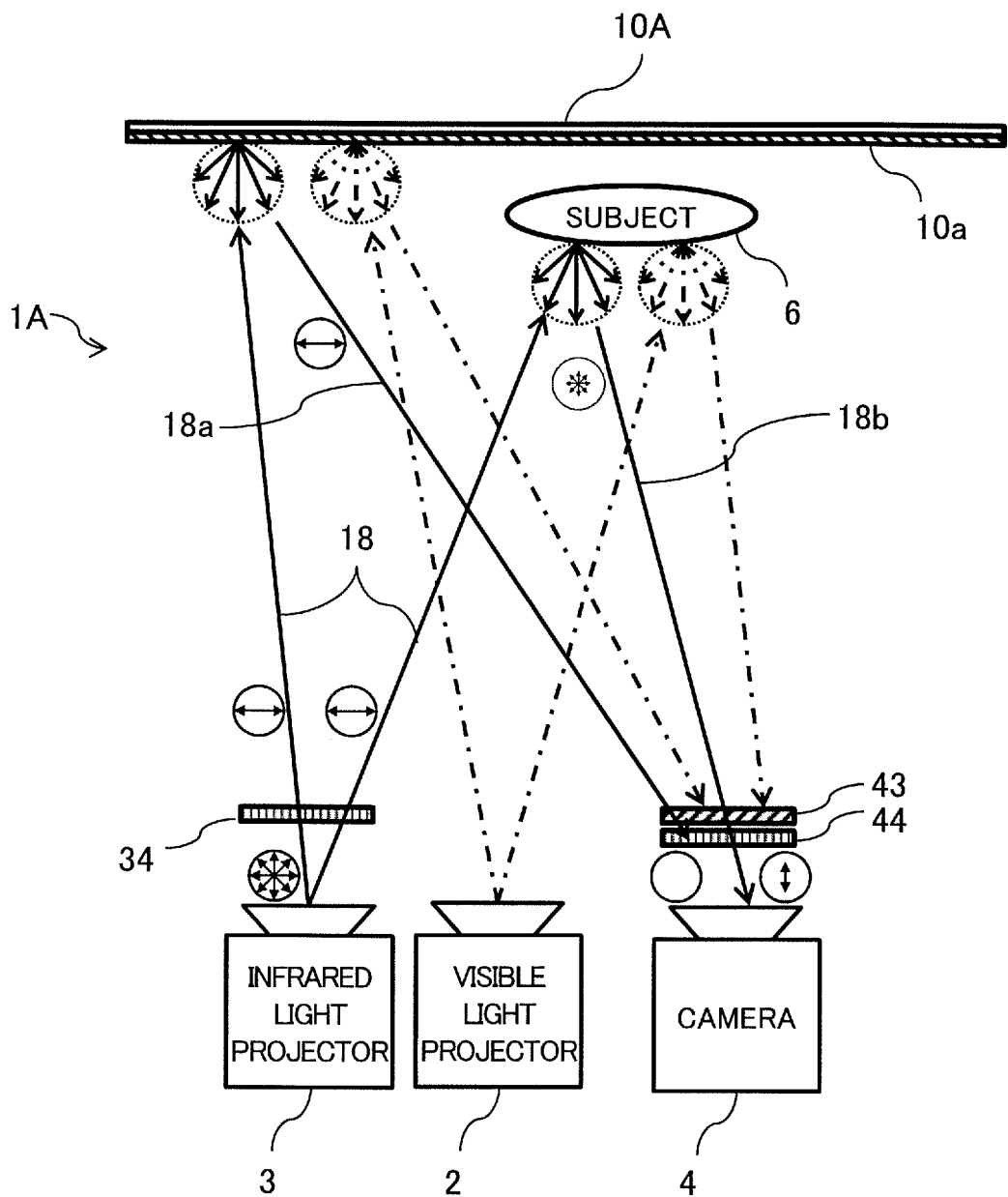
FIG. 8 is a drawing illustrating a screen and filters of the projection system according to the second embodiment.

The functions of the screen 10A and the first and second polarizing filters 34 and 44 in the projection system 1A of this embodiment will be described with reference to FIG. 8. FIG. 8 is a drawing illustrating the screen 10A and the filters 34 and 44 of the second embodiment.

The projection system 1A of this embodiment uses the screen 10A that preserves a polarization state at the time of reflection, and the first and second polarizing filters 34 and 44 to prevent the camera 4 from receiving infrared light emitted from the infrared light projector 3 and reflected on the projection surface of the screen 10A. Specifically, when the infrared light passes through the first polarizing filter 34, the first polarizing filter 34 transmits only a linearly polarized component that oscillates in a specific direction. When the infrared light is reflected on the screen 10A, the linearly polarized component is preserved, and when the infrared light passes through the second polarizing filter 44, the second polarizing filter 44 cuts off only the linearly polarized component.

This prevents a portion projected onto the screen 10A out of the image projected from the infrared light projector 3 from appearing in the capture image captured with the camera 4. On the other hand, the other portion projected onto and reflected on the subject 6 have its polarization disturbed, which in turn becomes substantially unpolarized light. Since some of the substantially unpolarized light reflected from the subject 6 passes through the second polarizing filter 44, the subject 6 appears in the capture image. This configuration makes the contours of the subject 6 distinct in the image captured with the camera 4 and thereby enables the determination of a shape of the subject 6 with a high degree of precision.

More specifically, as shown in FIG. 8, for example, infrared light 18 emitted from the infrared light projector 3 is unpolarized light (indicated by arrows extending in all directions in FIG. 8). Next, when the emitted infrared light 18 passes through the first polarizing filter 34, the first polarizing filter 34 transmits only a horizontally polarized component shown in FIG. 8 (the arrow extending in the horizontal direction). The infrared light 18 passed through the first polarizing filter 34 is reflected from the subject 6 or the screen 10A.

Since infrared light 18a reflected on the screen 10A has its polarization state preserved on the reflecting surface 10a of the screen 10A, the infrared light 18a after the reflection has only the horizontally polarized component (the arrow extending in the horizontal direction). Then, the horizontally polarized component is cut off by the second polarizing filter 44, thereby preventing the camera 4 from receiving the infrared light reflected from the screen 10A. On the other hand, infrared light 18b reflected on the subject 6 has its polarization disturbed on the surface of the subject 6, which in turn becomes unpolarized light (arrows extending in all directions). In this case, the horizontally polarized component is cut off by the second polarizing filter 44, while the other polarized components pass through the second polarizing filter 44 (arrows extending in the vertical direction). Accordingly, the infrared light reflected from the subject 6 is received by the camera 4. This configuration allows the camera 4 to capture an image in which the contours of the subject 6 clearly appears.

It is conceivable that technical difficulty arises for the first polarizing filter 34 to convert the infrared light 18 into light having only the horizontally polarized component. In this case, in order for the image pick-up device 41 to discriminate between the reflection from the screen 10A and the reflection from the subject 6, it suffices if there is a difference between respective sum totals of polarized components of the infrared light that pass through the second polarizing filter 44. From this viewpoint, a predetermined polarization state of the infrared light passed through the first polarizing filter 34 may be a state where a predetermined polarized component makes up more than 50% of the invisible light. More preferably, in order to discriminate between the reflection off the screen 10A and the reflection off the subject 6, a difference greater than or equal to 10% is made to the infrared light passed through the second polarizing filter 44. In other words, the predetermined polarization state of the infrared light passed through the first polarizing filter 34 may be a state where the predetermined polarized component makes up 60% or more of the invisible light.

In this embodiment, a silver screen may be used as the screen 10A to enable diffusion and reflection of visible light. This configuration allows the screen 10 to ensure visibility of images projected from the visible light projector 2.

3. Effects and Others

As described above, in this embodiment, the controller 5 of the projection system 1A obtains the information regarding the reflected light from the object other than the screen 10A, such as the contours of the subject 6. This configuration allows the image 71 to be projected fit for the shape of an object like the subject 6 with a high degree of precision.

In the projection system 1A of this embodiment, the screen 10A as an example of background members reflects invisible light incident on the reflecting surface 10a with the polarization state of the invisible light being preserved. The screen 10A is made up of a silver screen coated with metal powder, for example.

In the projection system 1A of this embodiment, the infrared light projector 3 serving as the invisible light projector emits invisible light having the predetermined polarization state made by the first polarizing filter 34, for example. The camera 4 is provided with the second polarizing filter 44 to cut off components having the above-described polarization state out of the invisible light incident on the camera 4.

The projection system 1A described above causes the screen 10A to reflect the invisible light emitted from the infrared light projector 3 with the polarization state being preserved, thereby causing the invisible light reflected from the screen 10A to be cut off by the second polarizing filter 44. This configuration enables the projection system 1 for projecting images fit for the shape or position of an object to obtain measurements of a shape of the subject 6 with a high degree of precision while detecting the position and the like of the subject 6 at high speed.

In this embodiment, the screen 10A diffusely reflects visible light. This configuration enables the screen 10A to show images projected from the visible light projector 2 and enhance stage effect produced by the projection system 1A.

The projection system 1A of this embodiment is not limited to the configuration in which the infrared light projector 3 projects the invisible light image 80A including the offset component with infrared light that is invisible light, but may use the infrared light illuminator 30 of the first embodiment (see FIG. 1), for example. In this configuration, the infrared light illuminator 30 projects infrared light having the same polarization state as the infrared light projected from the infrared light projector 3 has with the same configuration as the first polarizing filter 34, for example.

In this embodiment, the first polarizing filter 34 is a filter attached to the projection optical system 33 of the infrared light projector 3. The first polarizing filter 34 may be integrated with the projection optical system 33 of the infrared light projector 3. In the case where the infrared light source 31 of the infrared light projector 3 emits light having polarization corresponding to the above-described polarization state, the first polarizing filter 34 may be omitted. In this configuration, the infrared light source 31 includes a light emitting element such as a laser light source, for example.

In this embodiment, the second polarizing filter 44 is attached to the imaging lens 42 in the camera 4. The second polarizing filter 44 may be a filter that is built into the image pick-up device 41 or that is integrated with the imaging lens 42 in the camera 4.

The description has been given above of the configuration where the first polarizing filter 34 transmits only the linearly polarized component that oscillates in the specific direction as the polarization state, and the second polarizing filter 44 cuts off only the linearly polarized component that oscillates in the same direction. The polarization state for use in the projection system 1A of this embodiment is not limited to a specific linearly polarized component.

For example, the projection system 1A of this embodiment may have a configuration where the first polarizing filter 34 converts invisible light into only invisible light components having a predetermined polarization state, such as circularly polarized light or elliptically polarized light, and the second polarizing filter 44 cuts off only the invisible light components having the polarization state. This configuration also makes it possible to prevent invisible light having the predetermined polarization that is projected from the infrared light projector 3 and passes through the first polarizing filter 34 from being detected by the camera 4 through the second polarizing filter 44. The predetermined polarization state may be a state where the predetermined polarized component makes up more than 50% of or 60% or more of the invisible light.

Third Embodiment

A third embodiment will now be described with reference to the attached drawings. In the second embodiment, the screen 10A that diffusely reflects invisible light is used. In the third embodiment, a projection system using a screen that prevents invisible light from being diffusely reflected will be described with reference to FIGS. 9 and 10.

The projection system according to this embodiment will now be described. As for some configuration and operation identical to those of the respective projection systems 1 and 1A according to the first and second embodiments, redundant descriptions thereof are omitted.

Figure 9:
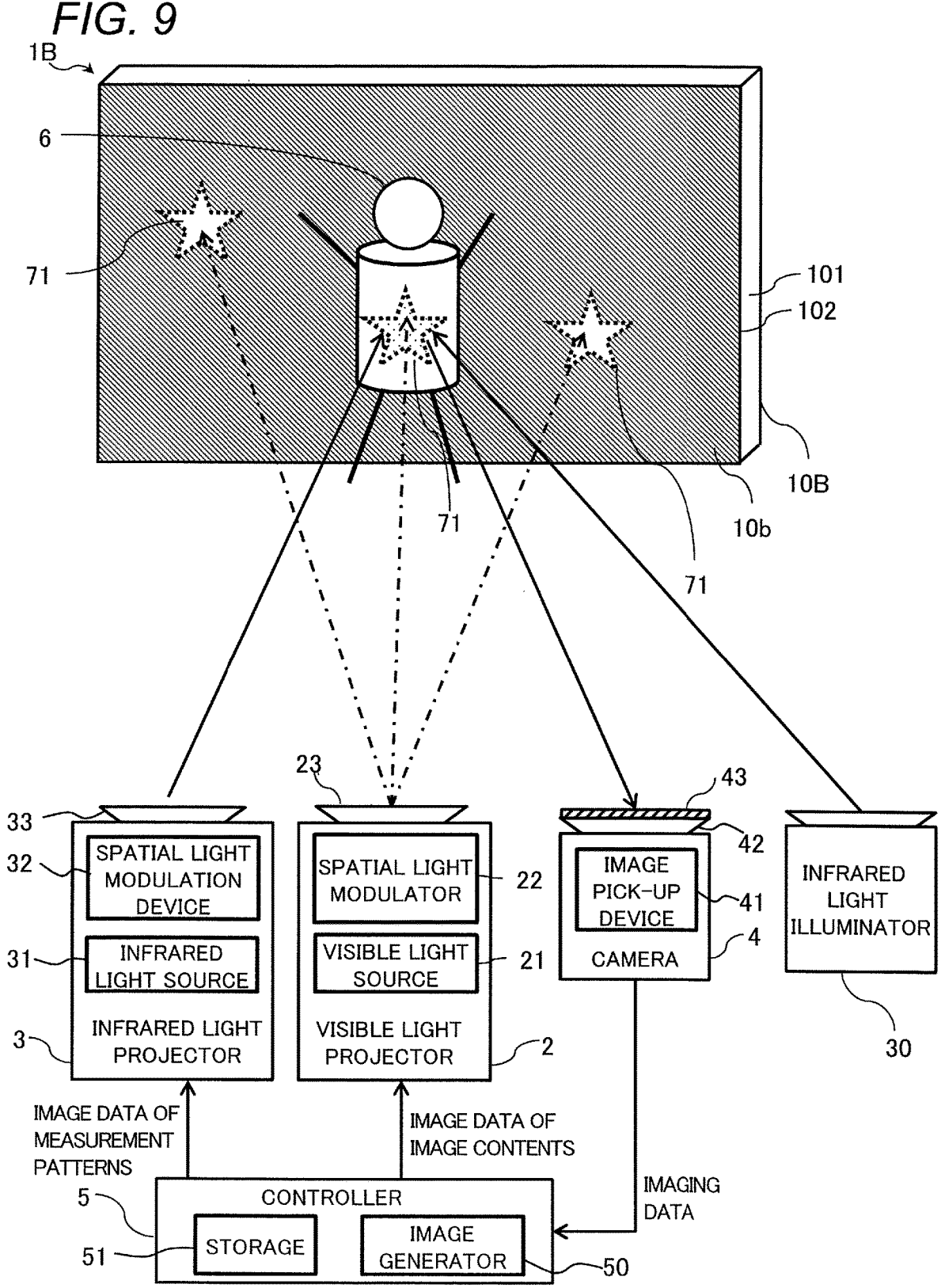
FIG. 9 is a block diagram illustrating a configuration of a projection system according to a third embodiment.

FIG. 9 is a block diagram illustrating a configuration of a projection system 1B according to the third embodiment. With the same configuration as the configuration of the first embodiment (see FIG. 1), the projection system 1B according to this embodiment includes a screen 10B, constituting a background member, which prevents infrared light from being diffusely reflected.

Figure 10:
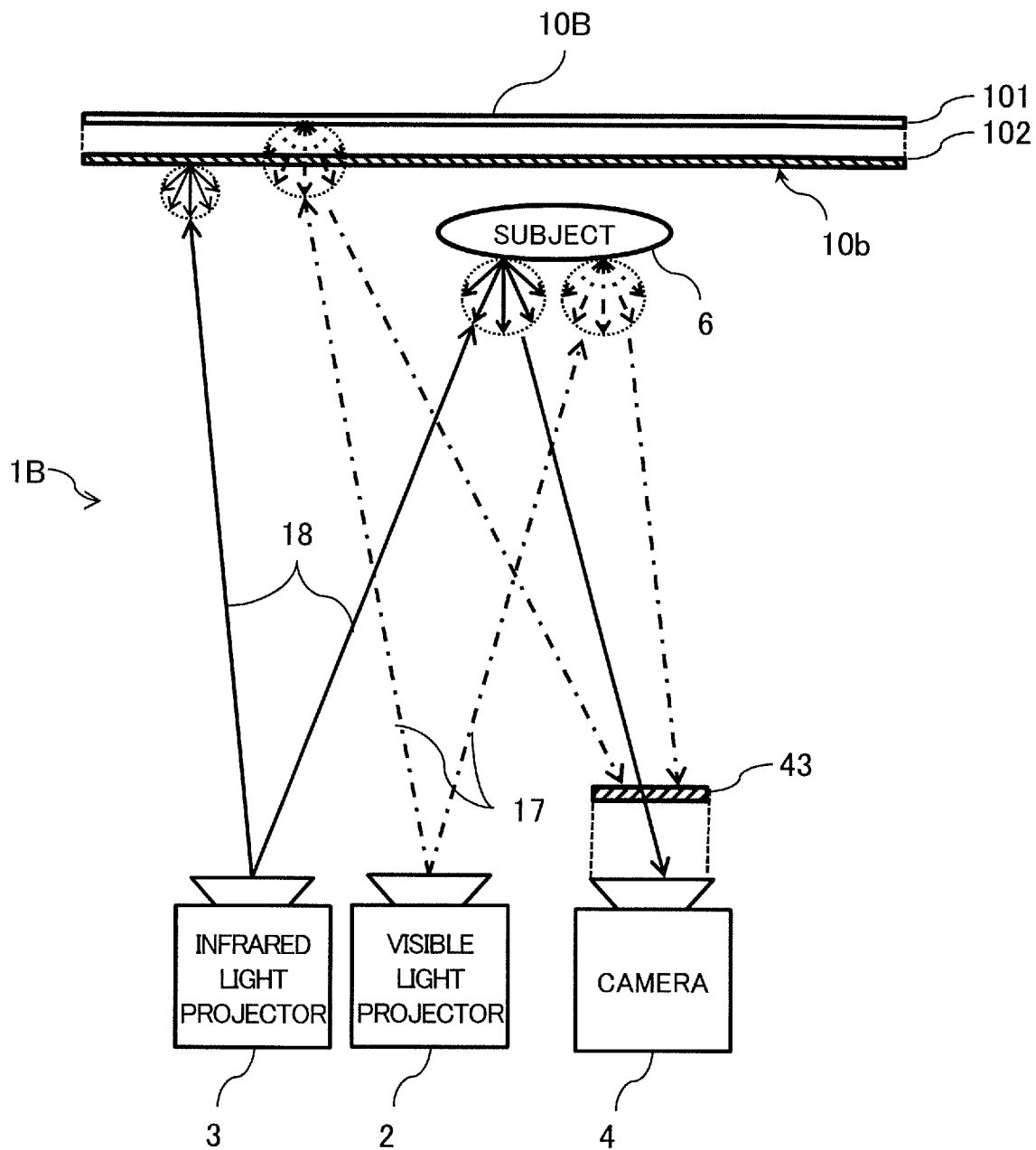
FIG. 10 is a drawing illustrating a screen of the projection system according to the third embodiment.

The screen 10B of the third embodiment has a two-layer structure including a visible light diffusion layer 101 that diffusely reflects visible light and an infrared light cut-off layer 102 that cuts off infrared light (see FIG. 10). A reflecting surface 10b of the screen 10B is made up of the visible light diffusion layer 101 covered with the infrared light cut-off layer 102. A projection surface of the screen 10B may be a flat surface or a curved surface as long as the projection surface cuts off infrared light and diffusely reflects visible light.

The visible light diffusion layer 101 of the screen 10B constitutes a projection surface that diffusely reflects visible light. The visible light diffusion layer 101 may be one of hanging screens of various kinds.

The infrared light cut-off layer 102 exhibits optical properties of transmitting visible light components of incident light at an average of 50% or more and absorbing infrared light components of the incident light at an average of 50% or more. The infrared light cut-off layer 102 is made up of, for example, a film. The infrared light cut-off layer 102 causes the projection surface of the screen 10B to serve as a light cut-off surface that prevents incident infrared light from being diffusely reflected. The infrared light cut-off layer 102 is an example of light cut-off components for use in the screen 10B. The infrared light cut-off layer 102 may be made up of a panel, for example, other than the film. Alternatively, the infrared light cut-off layer 102 may be formed by means such as application of a coating to the visible light diffusion layer 101.

The function of the screen 10B in the projection system 1B of this embodiment will be described with reference to FIG. 10. FIG. 10 is a drawing illustrating the screen 10B in the projection system 1B of the third embodiment.

In this embodiment, the visible light projector 2 projects the image 71 onto the screen 10B as well as the subject 6 (refer to FIG. 9). As shown in FIG. 10, visible light 17 from the visible light projector 2 needs to be diffusely reflected on the screen 10B to allow viewers or the like to visually identify the image 71 shown on the screen 10B. Meanwhile, if infrared light 18 from the infrared light projector 3 is as well diffusely reflected on the screen 10B, the boundary between a region of the subject 6 and the other region in measurement pattern images captured with the camera 4 will be indistinct.

To address this problem, the screen 10B of this embodiment includes the infrared light cut-off layer 102 to prevent the infrared light 18 from being diffusely reflected on the projection surface of the screen 10B (see FIG. 10). As a result, out of measurement patterns projected from the infrared light projector 3, some portions projected onto the screen 10B do not appear in a capture image with the camera 4, but just another portion projected onto the subject 6 appear in the capture image. This configuration makes the contours of the subject 6 distinct in the image captured with the camera 4 and thereby enables the determination of a shape and position of the subject 6 with a high degree of precision.

The screen 10B includes the visible light diffusion layer 101 that diffusely reflects visible light and the infrared light cut-off layer 102 that covers the visible light diffusion layer 101. As shown in FIG. 10, the infrared light cut-off layer 102 transmits the visible light 17 so as to allow the visible light 17 to diffusely reflect on the projection surface of the screen 10B. This configuration allows the screen 10B to ensure visibility of images projected from the visible light projector 2.

As described above, in the projection system 1B of this embodiment, the screen 10B as an example of background members prevents invisible light incident on the reflecting surface 10b from being diffusely reflected on the reflecting surface 10b. This configuration also allows information such as the contours of the subject 6 to be easily obtained in the two-dimensional detection as in the second embodiment.

In the projection system 1B of this embodiment, the subject 6 may include a marker 61 that is the same as the marker 16 of the first embodiment. The projection system 1B of this embodiment is capable of obtaining a two-dimensional position of the marker 61 in the two-dimensional detection as in the first embodiment.

In the above description, the configuration similar to the configuration of the first embodiment has been described as an example of the invisible light projector according to this embodiment, but the invisible light projector of this embodiment may be the infrared light projector 3 as in the second embodiment. This configuration also exhibits the same effect as the effect described above.

OTHER EMBODIMENTS

The first to third embodiments described above are provided to illustrate technologies disclosed in this patent application. The technologies according to the present disclosure, however, can be applied to any variations to which change, replacement, addition, omission, or the like are appropriately made, other than the embodiments described above. A new embodiment can be made by combining some structural elements in any of the embodiments described above. In light of this, other embodiments will be exemplified.

In the first embodiment, the marker 61 retroreflects invisible light. In the projection system of this embodiment, a marker that is not retroreflective may be included in an object subject to projection. The marker in the projection system of this embodiment may have a reflectance greater than or equal to a predetermined value such as 75%. This configuration causes the marker to appear at high brightness in the capture image and thereby exhibits the same effect as in the first embodiment.

In the embodiments described above, the examples have been described in which the invisible light images 80 and 80A include measurement patterns in accordance with the spatial encoding scheme. The invisible light image of this embodiment may include, for example, a measurement pattern in accordance with a phase difference contrast scheme or a random dot pattern, other than the measurement pattern in accordance with the spatial encoding scheme. The invisible light image may be appropriately set in accordance with the theory of obtaining three-dimensional measurements adopted for the projection system.

In the embodiments described above, the examples have been described in which the image 71 is projected onto an object like the subject 6, but an entity subject to the projection of the projection system is not particularly limited to such an object. For example, the projection system of this embodiment is capable of causing the visible light projector 2 to project a visible light image which does not appear on the object, as an image fit for a measured object, based on the measurement result of the object.

In the embodiments described above, the projection system 1 causes the image 71 to follow the subject 6, for example. An object subject to projection in the projection system according to the present disclosure may be a stationary object, such as a building, other than a moving subject. If a stationary object is subject to projection in the projection system, the position of the object need not necessarily be measured during projecting operation.

The embodiments have been described above as examples of the technologies according to the present disclosure. For that purpose, the accompanying drawings and detailed description are provided.

Consequently, the accompanying drawings and detailed description provided to illustrate the technologies described above may include structural elements that are not essential for resolving problems as well as those essential for resolving problems. Thus, it should not be immediately deemed that, merely based on the fact that the structural elements that are not essential are shown in the accompanying drawings and detailed description, the structural elements that are not essential are essential.

Since the embodiments described above are provided to illustrate technologies according to the present disclosure, various kinds of change, replacement, addition, omission, or the like may be made to these embodiments without departing from the scope of the claims and equivalents thereof.

A projection system according to the present disclosure can find a variety of uses where an image is projected onto an object.

The invention claimed is:

1. A projection system that projects an image based on a measurement of an object including a marker, the projection system comprising:

a visible light projector that projects an image with visible light;

an invisible light projector that projects an invisible light image onto the object with invisible light;

an imaging device that captures the invisible light image projected from the invisible light projector; and a controller that obtains information regarding reflected invisible light from the object while obtaining three-dimensional measurements of the object to control the image, based on a capture image captured with the imaging device, wherein the invisible light image includes a bright region having a predetermined invisible light amount and a dark region having an invisible light amount less than the invisible light amount of the bright region, the invisible light projector emits invisible light to cause the invisible light amount of the dark region in the invisible light image to be more than or equal to a predetermined offset value, the predetermined offset value thus providing the invisible light amount to the dark region, and the predetermined offset value is set to provide the invisible light amount to the dark region such that the marker receives the invisible light amount at the dark region to result in the amount of the invisible light reflected by the marker at the dark region being larger than the amount of the invisible light reflected by remaining portions of the object other than the marker at the bright region.

2. The projection system according to claim 1, wherein the information regarding the reflected invisible light from the object includes a two-dimensional position of the marker.

3. The projection system according to claim 1, wherein the marker retroreflects the invisible light.

4. The projection system according to claim 1, further comprising a background member disposed behind the object in a direction in which the invisible light projector emits the invisible light.

5. The projection system according to claim 4, wherein the controller obtains information regarding invisible light reflected from the object other than the background member.

6. The projection system according to claim 4, wherein the background member reflects invisible light incident thereon with a polarization state of the invisible light being preserved.

7. The projection system according to claim 6, wherein the invisible light projector emits the invisible light having a predetermined polarization state, and a polarizer is provided to cut off a component having the predetermined polarization state out of invisible light incident on the imaging device.

8. The projection system according to claim 6, wherein the background member prevents invisible light incident thereon from being diffusely reflected.

9. The projection system according to claim 1, wherein the invisible light image includes a measurement pattern in accordance with a spatial coding scheme.

10. The projection system according to claim 1, wherein the controller generates a depth image based on a plurality of frames of capture image for the invisible light image, the controller detects in two dimensions the position or contour of the object on each frame of capture image by detecting the pixels having a brightness more than a predetermined threshold, and the controller corrects the image projected by the visible light projector three-dimensionally each time the depth image is generated, and, within a period corresponding to a plurality of frames until a new depth image is obtained, two-dimensionally on a frame-by-frame basis based on the two dimensional detection.

* * * * *